United States Patent
Trika (10) Patent No.: US 12,468,461 B2
(45) Date of Patent: Nov. 11, 2025

(54) AUTOMATIC SELECTION OF COMPUTATIONAL NON-VOLATILE MEMORY TARGETS

(71) Applicant: SK Hynix NAND Product Solutions Corp., Rancho Cordova, CA (US)

(72) Inventor: Sanjeev Trika, Portland, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 898 days.

(21) Appl. No.: 17/459,414

(22) Filed: Aug. 27, 2021

(65) Prior Publication Data

US 2021/0389890 A1 Dec. 16, 2021

(51) Int. Cl.
*G06F 3/06* (2006.01)

(52) U.S. Cl.
CPC .......... *G06F 3/0635* (2013.01); *G06F 3/0604* (2013.01); *G06F 3/0632* (2013.01); *G06F 3/0659* (2013.01); *G06F 3/0688* (2013.01)

(58) Field of Classification Search
CPC .... G06F 3/0635; G06F 3/0604; G06F 3/0659; G06F 3/0688
See application file for complete search history.

(56) References Cited

U.S. PATENT DOCUMENTS

| | | | | |
|---|---|---|---|---|
| 2010/0153925 | A1* | 6/2010 | Klein | G06F 11/3409 717/127 |
| 2019/0166192 | A1* | 5/2019 | Ding | G06F 3/067 |
| 2021/0037140 | A1* | 2/2021 | Morgan | H04M 3/42382 |
| 2022/0019541 | A1* | 1/2022 | Dubey | G06F 13/1668 |

OTHER PUBLICATIONS

U.S. Appl. No. 17/313,668, entitled "Device-Initiated Input/Output Assistance For Computational Non-Volatile Memory On Disk-Cached And Tiered Systems," filed on May 6, 2021, 31 pages.

* cited by examiner

*Primary Examiner* — Baboucarr Faal
(74) *Attorney, Agent, or Firm* — Haley Guiliano LLP (57) ABSTRACT

Systems, apparatuses and methods may provide for memory controller technology that detects an application function, a data specifier associated with the application function, and one or more operating parameters associated with the application function, generates execution estimates for a plurality of computational storage devices based on the application function, the data specifier, the operating parameter(s), and one or more device capabilities associated with the plurality of computational storage devices, and selects a target storage device from the plurality of storage devices based on the execution estimates.

17 Claims, 3 Drawing Sheets

AUTOMATIC SELECTION OF COMPUTATIONAL NON-VOLATILE MEMORY TARGETS

TECHNICAL FIELD

Embodiments generally relate to memory structures. More particularly, embodiments relate to automatic selection of computational non-volatile memory (NVM) targets.

BACKGROUND

Computational storage is a technique that may move compute operations to data, rather than moving data to the primary central processing unit (CPU) of a system for calculations to be performed. This approach can take many forms such as, for example, moving application-specified functions to execute on a drive that is a level logically "below" a controller/CPU of a caching subsystem containing one or more drives. Although the reduction in data movement may result in significant performance and power advantages, there remains considerable room for improvement. For example, user-based or application-based specification of the target computational drive may be error-prone, inefficient and/or complicated for the user.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
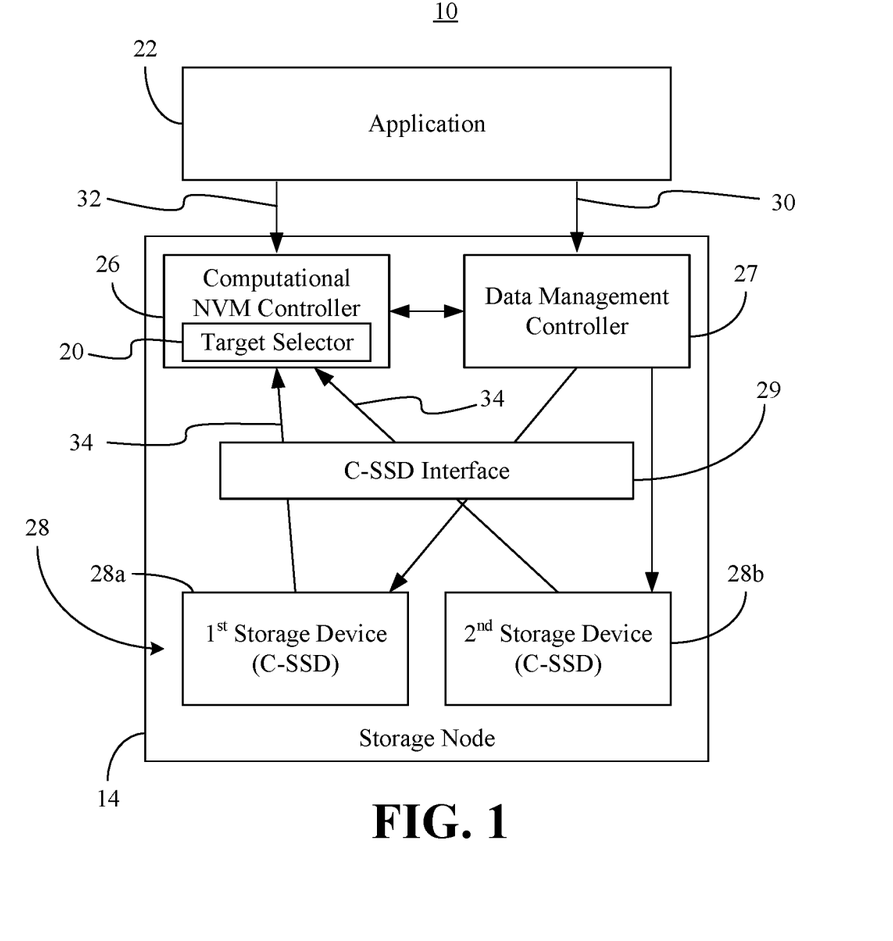
FIG. 1 is a block diagram of an example of a computing system according to an embodiment.

Turning now to FIG. 1, a computing system 10 is shown in which a host device (e.g., CPU, host processor, not shown) executes an application 22 (e.g., database application). In an embodiment, the application 22 includes a function (e.g., "lambda" function such as a search function or other application function) that operates on relatively large amounts of data located in a storage node 14. Rather than moving the data from the storage node 14 to the host device, a driver on the host device transfers the function to the storage node 14 for execution. In an embodiment, the storage node 14 includes a memory controller 26 (e.g., computational non-volatile memory/NVM controller), a data management controller 27 (e.g., cache, tiering, sharding and/or erasure-coding controller) and a plurality of storage devices 28 (28a, 28b, e.g., computational solid state drives/C-SSDs).

More particularly, the plurality of storage devices 28 include a first storage device 28a having a first processor (not shown) and a second storage device 28b having a second processor (not shown), wherein the processors are able to execute the function from the application 22. In one example, the second storage device 28b operates more slowly than the first storage device 28a. Thus, in a disk-caching environment, the first (e.g., relatively fast) storage device 28a may be a caching storage device (e.g., INTEL OPTANE solid state drive/SSD) for the second (e.g., relatively slow) storage device 28b, which is used as a backing storage device (e.g., quad-level cell/QLC SSD). In a tiered environment, both storage devices 28 may be tiered storage devices, with the first storage device 28a being assigned to a lower tier than the second storage device 28b.

The illustrated controllers 26, 26 communicate with one another directly and communicate with the storage devices 28 via an interface 29. In an embodiment, the memory controller 26 includes a target selector 20 (e.g., logic instructions, configurable hardware, fixed-function hardware, etc., or any combination thereof) to detect the function, a data specifier (e.g., file, object and/or logical block address/LBA range to operate on) associated with the function, and one or more operating parameters (e.g., preferences and/or criteria) associated with the function.

The target selector 20 may also generate execution estimates for the storage devices 28 based on the function, the data specifier, the operating parameter(s) and one or more device capabilities 34 (e.g., power, memory, access time, fixed-function and/or performance capabilities) associated with the storage devices 28. The execution estimates may include, for example, the cost to read data, the cost to transfer data, the cost to execute the function on data, and so forth. In such a case, the target selector 20 automatically selects a target storage device from the storage devices 28 based on the execution estimates and sends the function to the target storage device for execution. To the extent that the target selector 20 is implemented in logic instructions, the logic instructions may be retrieved from the storage devices 28 and/or internal memory (e.g., local cache or other memory) of the memory controller 26. As already noted, the target selector 20 may alternatively be implemented at least partly in one or more of configurable or fixed-functionality hardware.

More particularly, the application 22 may issue data operations 30 (e.g., read operations, write operations) to the data management controller 27 and issue function information 32 (e.g., lambda function, criteria/requirements, data specifier, preferences) to the memory controller 26. With regard to the criteria portion of the function information 32, lambda functions may be extended to include optional indicators of compute requirements to operate on a given dataset such as, for example, normalized CPU-cycles for a specified dataset-size, memory requirements, whether the function is dynamic or static (e.g., dynamic if execution time depends on the being data operated on), fixed cost (e.g., compute and/or memory) of executing/running the function, asymptotic cost (e.g., compute and/or memory), and so forth. In an embodiment, the asymptotic cost is based on the asymptotic complexity (e.g., linear, quadratic, exponential) of the function.

With regard to the preferences portion of the function information 32, the application 22 may have the ability to specify preferences to the memory controller 26. In an embodiment, the preferences specify the optimization criteria (e.g., total time, data movement, or power) and a preferred (e.g., not mandated) target storage device. The application 22 may change the preferences at runtime and may even change the preferences per function invocation (e.g., tie the preferences to a lambda call).

As already noted, the target selector 20 is responsible for selecting the target storage device based on gathered device intelligence, user/application preferences, and info about lambda requirements. The operation of the target selector 20 will be discussed in greater detail below.

In an embodiment, the interface 29 is extended to specify quantified device capabilities 34 of the computational storage devices 28. The quantified device capabilities 34 include not only information about the normalized processing power and memory available in the storage devices 28 (e.g., on a per device basis) for compute functions, but also internal media access times (e.g., reads, writes), the size of the CPU-cache, the performance of offered fixed functions, specifics of available fixed functions, the expected power consumption to execute the fixed/programmable functions, and the performance profile of the storage devices 28. The telemetry set is widely extensible, and the listing above is exemplary. The target selector 20 also generates queries for information about supportable data transfer speeds across the bus connecting the memory controller 26 to the storage devices 28, and the current usage of the bus. Although the illustrated example shows a storage node 14 to facilitate discussion, embodiments are not limited to storage nodes (e.g., datacenters) and may be incorporated into any computing system with computational storage devices 28. The memory controller 26 and/or the computing system 10 are considered performance-enhanced at least to the extent that automatically specifying the target computational storage device by the memory controller 26 is less error-prone, more efficient and/or less complicated for the user.

The storage devices 28 may be part of a memory device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Figure 2:
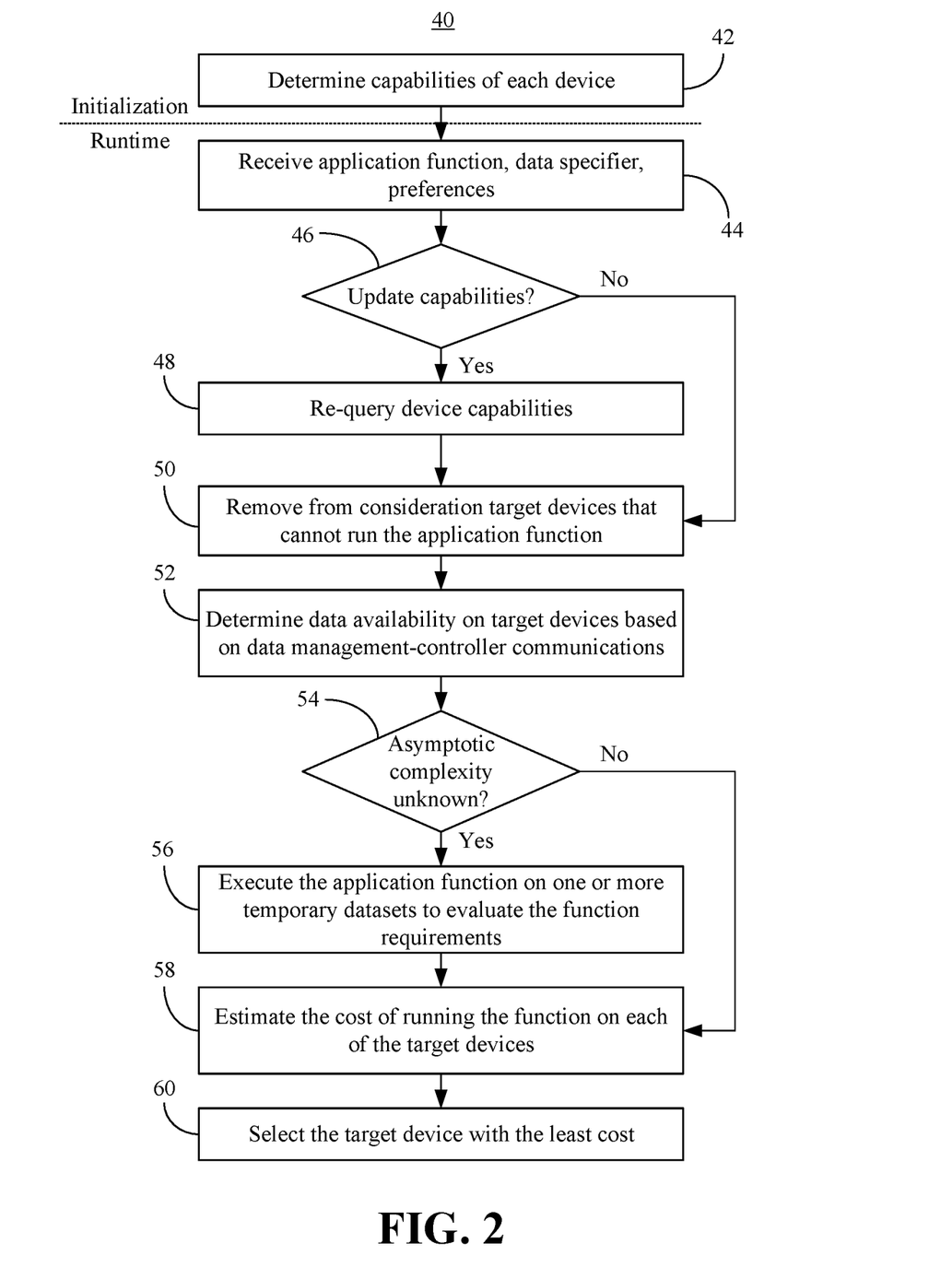
FIG. 2 is a flowchart of an example of a method of operating a target selector according to an embodiment.

FIG. 2 shows a method 40 of operating a target selector. The method 40 may generally be implemented in a target selector such as, for example, the target selector 20 (FIG. 1), already discussed. More particularly, the method 40 may be implemented in a set of logic instructions stored in a machine- or computer-readable storage medium such as RAM, ROM, PROM, firmware, flash memory, etc., configurable hardware such as, for example, programmable logic arrays (PLAs), field-programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof.

Illustrated processing block 42 determines the capabilities of each computational storage device at an initialization time. Block 44 receives, at runtime, the application specified lambda function, including associated criteria, associated function parameters, and a specification of the data to operate on. If the user/application specifies a "strict" target preference (e.g., a directive), then the method 40 may terminate and follow the user directive.

Block 46 determines whether an update to the storage device capabilities is appropriate. For example, block 46 may take into consideration whether the workloads are relatively dynamic or running in dual-ported systems where the storage device may also be executing lambdas from a different controller. If so, block 48 re-queries the storage devices for the respective quantitative capabilities. Otherwise, the method 40 bypasses block 48 and proceeds to block 50, which removes from contention/consideration the storage devices whose capabilities cannot support the lambda requirements. For example, if the specified lambda is a fixed function specifier that the NAND C-SSD cannot support in the exemplary configuration and the fixed function is supported by the OPTANE C-SSD, then the latter becomes the target device, and the method 40 may terminate. If no target device remains in contention, then the C-SSD controller simply informs the application that the storage devices are not able to execute the lambda.

Block 52 determines where the target dataset resides, via consulting the data management (e.g., cache) controller with the specified (e.g., static) data range. The data management controller may specify the amount of relevant data that is dirty in the cache, the amount of relevant data that is clean in the cache, and the amount of data missing in the cache. In this context, "relevant data" refers to the data that will be accessed by this specific lambda execution.

A determination may be made at block 54 as to whether the asymptotic complexity of the function is known. For example, if the application has not specified lambda requirements, or if the requirements are insufficient to estimate the cost of running the lambda on a given device, block 56 executes the application function on one or more temporary datasets to evaluate the function requirements. In an embodiment, block 56 generates and/or obtains a temporary and/or small dataset and places the dataset on the computational storage device. Block 56 then runs the same lambda function on the temporary/small dataset, advising the storage device to only allow the lambda to access the temporary dataset. In such a case, block 56 measures the time taken and other relevant (e.g., memory allocation) telemetry. In one example, block 56 runs the function on multiple such temporary datasets, of increasing sizes, to estimate at runtime the asymptotic complexity of the lambda function. If it is determined at block 54 that the asymptotic complexity is not unknown, the method 50 bypasses block 56 and proceeds to block 58.

In an embodiment, block 58 estimates the cost of executing the specified lambda on the specified dataset, on each candidate storage device. The cost may refer to performance or other user-specified optimization criteria (e.g., indicated by the user/application as a preference). A simple or complex model may be used to estimate the cost. For example, a simple model for the performance of a given lambda may be estimated for an OPTANE storage device as:

ExamplePerfEstimator$_{Optane}$=max(amount of relevant data on Optane SSD*read perf of Optane SSD, amount of relevant data on NAND SSD*read perf of NAND SSD,amount of relevant data on NAND SSD*bus transfer speed)+(the fixed time cost of running the lambda on the Optane SSD)+(the asymptotic time cost of running the lambda on the Optane SSD for the given data size)

Thus, the first underlying term of the above maximum component captures the cost to read data from the OPTANE SSD, the second underlying term of the maximum component captures the cost to read data from the NAND SSD, and the third underlying term of the maximum component captures the cost to transfer data from the NAND SSD to the OPTANE SSD. The maximum component is used because the read and transfer operations may be conducted substantially in parallel (e.g., the overlapping nature of the operations permits consideration of only the operation with the greatest cost). The second overall term above captures the fixed cost of executing the application function on the OPTANE SSD (e.g., associated with setup and or teardown of the function) and the third overall term above captures the variable cost that is dependent on the amount of data and the asymptotic complexity of the function.

The calculation may incorporate other parameters provided by the application when calling the lambda. For example, the calculation may consider whether the data reads are "stream-able"/"pipeline-able" along with the calculations, measurements from block 56 and/or information from the cache controller about which sections are in which device. Similarly, the cost can include information about memory consumption.

Block 60 selects the C-SSD with the minimum estimated cost. If the estimated costs, however, are within a tolerance for multiple candidate target devices, the user preference may be used to select the target device. The method 40 may also maintain a history of lambda executions and respective costs on the full dataset to guide better estimates for future executions (e.g., using machine learning/ML, and/or artificial intelligence/AI techniques). Once the target has been automatically selected, techniques may be employed to ensure that the correct data is used in the lambda computation.

Figure 3:
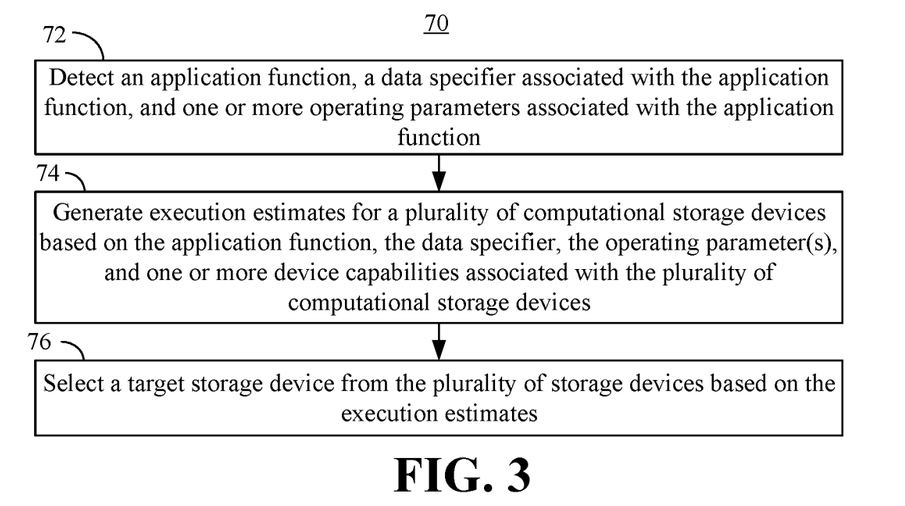
FIG. 3 is a flowchart of an example of a method of operating a performance-enhanced memory controller according to an embodiment.

FIG. 3 shows a method 70 of operating a performance-enhanced memory controller. The method 70 may generally be implemented in a memory controller such as, for example, the memory controller 26 (FIG. 1), already discussed. More particularly, the method 70 may be implemented in a set of logic instructions stored in a machine- or computer-readable storage medium such as RAM, ROM, PROM, firmware, flash memory, etc., configurable hardware such as, for example, PLAs, FPGAs, CPLDs, in fixed-functionality hardware using circuit technology such as, for example, ASIC, CMOS or TTL technology, or any combination thereof.

Illustrated processing block 72 provides for detecting an application function (e.g., lambda function or "lambda"), a data specifier associated with the application function, and one or more operating parameters associated with the application function. As already noted, the operating parameter(s) may include one or more preferences and one or more criteria. Block 74 generates execution estimates for a plurality of computational storage devices based on the application function, the data specifier, the operating parameter(s), and one or more device capabilities associated with the plurality of computational storage devices. In an embodiment, the execution estimates include the cost to read data, the cost to transfer data and the cost to execute the function on data. The one or more device capabilities may be determined at an initialization time and/or updated at runtime. In one example, the device capabilities include one or more of power capabilities, memory capabilities, access time capabilities, fixed-function capabilities or performance capabilities. Block 76 selects a target storage device from the plurality of storage devices based on the execution estimates. In an embodiment, block 76 also includes sending the application function to the target storage device for execution (e.g., ensuring that correct results are obtained even though all relevant data does not reside on the target storage device). The method 70 therefore enhances performance at least to the extent that automatically selecting the target computational storage device is less error-prone, more efficient and/or less complicated for the user.

Figure 4:
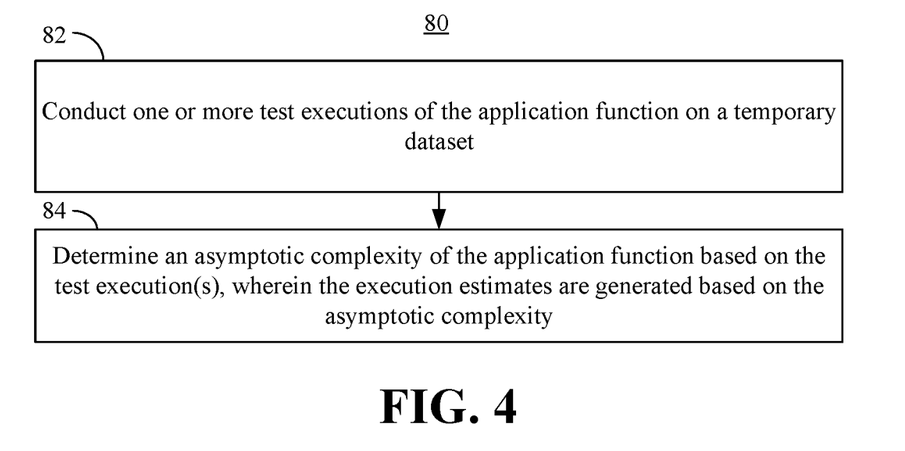
FIG. 4 is a flowchart of an example of a method of generating execution estimates for a plurality of computational storage devices according to an embodiment.

FIG. 4 shows a method 80 of generating execution estimates for a plurality of computational storage devices. The method 80 may generally be incorporated into block 74 (FIG. 3), already discussed. More particularly, the method 80 may be implemented in a set of logic instructions stored in a machine- or computer-readable storage medium such as RAM, ROM, PROM, firmware, flash memory, etc., configurable hardware such as, for example, PLAs, FPGAs, CPLDs, in fixed-functionality hardware using circuit technology such as, for example, ASIC, CMOS or TTL technology, or any combination thereof.

Illustrated processing block 82 conducts one or more test executions (e.g., microbenchmarks) of the application function on a temporary dataset. For example, block 82 may issue simple read/write tests to measure throughput and/or latencies. In an embodiment, block 84 determines an asymptotic complexity (e.g., linear, quadratic, exponential) of the application function based on the one or more test executions, wherein the execution estimates are generated based on the asymptotic complexity.

Figure 5:
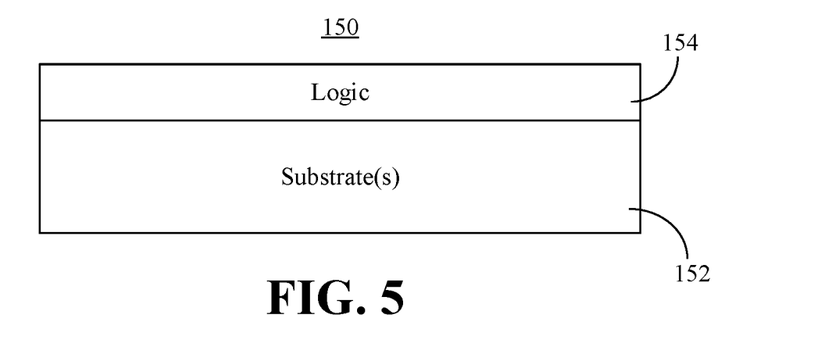
FIG. 5 is an illustration of an example of a semiconductor apparatus according to an embodiment.

FIG. 5 shows a semiconductor apparatus 150 (e.g., chip and/or package). The illustrated apparatus 150 includes one or more substrates 152 (e.g., silicon, sapphire, gallium arsenide) and logic 154 (e.g., transistor array and other integrated circuit/IC components) coupled to the substrate(s) 152. Thus, the illustrated logic 154 is implemented at least partly in configurable or fixed-functionality hardware. In an embodiment, the logic 154 implements one or more aspects of the method 40 (FIG. 2), the method 70 (FIG. 3) and/or the method 80 (FIG. 4), already discussed.

Thus, the logic 154 detects an application function, a data specifier associated with the application function, and one or more operating parameters (e.g., preferences and/or criteria) associated with the application function. The logic 154 also generates execution estimates for a plurality of computational storage devices based on the application function, the data specifier, the one or more operating parameters, and one or more device capabilities associated with the plurality of computational storage devices. Additionally, the logic 154 automatically selects a target storage device from the plurality of storage devices based on the execution estimates.

In one example, the logic 154 includes transistor channel regions that are positioned (e.g., embedded) within the substrate(s) 152. Thus, the interface between the logic 154 and the substrate(s) 152 may not be an abrupt junction. The logic 154 may also be considered to include an epitaxial layer that is grown on an initial wafer of the substrate 152.

ADDITIONAL NOTES AND EXAMPLES

Example 1 includes a semiconductor apparatus comprising one or more substrates and logic coupled to the one or more substrates, wherein the logic is implemented at least partly in one or more of configurable or fixed-functionality hardware, the logic to detect an application function, a data specifier associated with the application function, and one or more operating parameters associated with the application function, generate execution estimates for a plurality of computational storage devices based on the application function, the data specifier, the one or more operating parameters, and one or more device capabilities associated with the plurality of computational storage devices, and select a target storage device from the plurality of storage devices based on the execution estimates.

Example 2 includes the semiconductor apparatus of Example 1, wherein the execution estimates include a cost to read data, a cost to transfer data and a cost to execute the application function on data.

Example 3 includes the semiconductor apparatus of Example 1, wherein the logic is to conduct one or more test executions of the application function on a temporary dataset, and determine an asymptotic complexity of the application function based on the one or more test executions, wherein the execution estimates are generated based on the asymptotic complexity.

Example 4 includes the semiconductor apparatus of Example 1, wherein the logic is to determine the one or more device capabilities at an initialization time, and update the one or more device capabilities at a runtime.

Example 5 includes the semiconductor apparatus of Example 1, wherein the one or more device capabilities include one or more of power capabilities, memory capabilities, access time capabilities, fixed-function capabilities or performance capabilities.

Example 6 includes the semiconductor apparatus of any one of Examples 1 to 5, wherein the one or more operating parameters include one or more preferences and one or more criteria.

Example 7 includes a performance-enhanced computing system comprising a plurality of computational storage devices, a memory controller coupled to the plurality of storage devices, and a memory comprising a set of instructions, which when executed by the controller, cause the memory controller to detect an application function, a data specifier associated with the application function, and one or more operating parameters associated with the application function, generate execution estimates for the plurality of computational storage devices based on the application function, the data specifier, the one or more operating parameters, and one or more device capabilities associated with the plurality of computational storage devices, and select a target storage device from the plurality of storage devices based on the execution estimates.

Example 8 includes the computing system of Example 7, wherein the execution estimates include a cost to read data, a cost to transfer data and a cost to execute the application function on data.

Example 9 includes the computing system of Example 7, wherein the instructions, when executed, further cause the controller to conduct one or more test executions of the application function on a temporary dataset, and determine an asymptotic complexity of the application function based on the one or more test executions, wherein the execution estimates are generated based on the asymptotic complexity.

Example 10 includes the computing system of Example 7, wherein the instructions, when executed, further cause the controller to determine the one or more device capabilities at an initialization time, and update the one or more device capabilities at a runtime.

Example 11 includes the computing system of Example 7, wherein the one or more device capabilities include one or more of power capabilities, memory capabilities, access time capabilities, fixed-function capabilities or performance capabilities.

Example 12 includes the computing system of any one of Examples 7 to 11, wherein the one or more operating parameters include one or more preferences and one or more criteria.

Example 13 includes at least one computer readable storage medium comprising a set of instructions, which when executed by a memory controller, cause the memory controller to detect an application function, a data specifier associated with the application function, and one or more operating parameters associated with the application function, generate execution estimates for a plurality of computational storage devices based on the application function, the data specifier, the one or more operating parameters, and one or more device capabilities associated with the plurality of computational storage devices, and select a target storage device from the plurality of storage devices based on the execution estimates.

Example 14 includes the at least one computer readable storage medium of Example 13, wherein the execution estimates include a cost to read data, a cost to transfer data and a cost to execute the application function on data.

Example 15 includes the at least one computer readable storage medium of Example 13, wherein the instructions, when executed, further cause the computing system to conduct one or more test executions of the application function on a temporary dataset, and determine an asymptotic complexity of the application function based on the one or more test executions, wherein the execution estimates are generated based on the asymptotic complexity.

Example 16 includes the at least one computer readable storage medium of Example 13, wherein the instructions, when executed, further cause the computing system to determine the one or more device capabilities at an initialization time, and update the one or more device capabilities at a runtime.

Example 17 includes the at least one computer readable storage medium of Example 13, wherein the one or more device capabilities include one or more of power capabilities, memory capabilities, access time capabilities, fixed-function capabilities or performance capabilities.

Example 18 includes the at least one computer readable storage medium of any one of Examples 13 to 17, wherein the one or more operating parameters include one or more preferences and one or more criteria.

Example 19 includes a method of operating a performance-enhanced memory controller, the method comprising detecting an application function, a data specifier associated with the application function, and one or more operating parameters associated with the application function, generating execution estimates for a plurality of computational storage devices based on the application function, the data specifier, the one or more operating parameters, and one or more device capabilities associated with the plurality of computational storage devices, and selecting a target storage device from the plurality of storage devices based on the execution estimates.

Example 20 includes the method of Example 19, wherein the execution estimates include a cost to read data, a cost to transfer data and a cost to execute the application function on data.

Example 21 includes means for performing the method of any one of Examples 19 to 20.

Technology described herein therefore automatically, and at runtime, determines what a target computational storage device should be. For example, without this technology, data may be moved wastefully to a backing store of a cache device and operated on there, even though it is more efficient to execute the computational-NVM function on the cache device. Optional application-hooks are provided for applications to have more control over what the target device should be. The technology extends broadly to systems with multiple local or network-connected disks, volumes, and persistent-memory devices, of different media types, which may be arranged as caches, tiers, and with other distributed-data topologies.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A semiconductor apparatus comprising:
one or more substrates; and
logic coupled to the one or more substrates, wherein the logic is implemented at least partly in one or more of configurable or fixed-functionality hardware, the logic to:
detect an application function to execute on a computational storage device with a data specifier of data to operate on with the application function, the application function having one or more operating parameters to define execution of the application function;
determine whether an asymptotic complexity of the application function is known;
based on determining that the asymptotic complexity of the application function is known, generate, based on the asymptotic complexity, execution estimates for a plurality of computational storage devices based on the application function, the data specifier, the one or more operating parameters, and computational and storage capabilities associated with the plurality of computational storage devices;

based on determining that the asymptotic complexity of the application function is unknown:
  conduct one or more test executions of the application function on a temporary dataset;
  determine a new asymptotic complexity of the application function based on the one or more test executions; and
  generate, based on the new asymptotic complexity, the execution estimates for a plurality of computational storage devices based on the application function, the data specifier, the one or more operating parameters, and computational and storage capabilities associated with the plurality of computational storage devices; and
  select a target computational storage device from the plurality of computational storage devices based on the execution estimates.

2. The semiconductor apparatus of claim 1, wherein the execution estimates include a cost to read data, a cost to transfer data and a cost to execute the application function on data.

3. The semiconductor apparatus of claim 1, wherein the logic is to:
  determine the computational and storage capabilities at an initialization time; and
  update the computational and storage capabilities at a runtime.

4. The semiconductor apparatus of claim 1, wherein the computational and storage capabilities include one or more of power capabilities, memory capabilities, access time capabilities, fixed-function capabilities or performance capabilities.

5. The semiconductor apparatus of claim 1, wherein the one or more operating parameters include one or more preferences and one or more criteria.

6. A computing system comprising:
  a plurality of computational storage devices;
  a memory controller coupled to the plurality of computational storage devices; and
  a memory comprising instructions, which when executed cause the memory controller to:
    detect an application function to execute on one of the plurality of computational storage devices with a data specifier of data to operate on which the application function, the application function having one or more operating parameters to define execution of the application function,
    determine whether an asymptotic complexity of the application function is known;
    based on determining that the asymptotic complexity of the application function is known, generate, based on the asymptotic complexity, execution estimates for a plurality of computational storage devices based on the application function, the data specifier, the one or more operating parameters, and computational and storage capabilities associated with the plurality of computational storage devices;
    based on determining that the asymptotic complexity of the application function is unknown:
      conduct one or more test executions of the application function on a temporary dataset;
      determine a new asymptotic complexity of the application function based on the one or more test executions; and
      generate, based on the new asymptotic complexity, the execution estimates for the plurality of computational storage devices based on the application function, the data specifier, the one or more operating parameters, and computational and storage capabilities associated with the plurality of computational storage devices, and
    select a target computational storage device from the plurality of computational storage devices based on the execution estimates.

7. The computing system of claim 6, wherein the execution estimates include a cost to read data, a cost to transfer data and a cost to execute the application function on data.

8. The computing system of claim 6, wherein the instructions, when executed, further cause the memory controller to:
  determine the computational and storage capabilities at an initialization time; and
  update the computational and storage capabilities at a runtime.

9. The computing system of claim 6, wherein the computational and storage capabilities include one or more of power capabilities, memory capabilities, access time capabilities, fixed-function capabilities or performance capabilities.

10. The computing system of claim 6, wherein the one or more operating parameters include one or more preferences and one or more criteria.

11. At least one computer readable storage medium comprising instructions, which when executed by a memory controller, cause the memory controller to:
  detect an application function to execute on a computational storage device with a data specifier of data to operate on with the application function, the application function having one or more operating parameters to define execution of the application function;
  determine whether an asymptotic complexity of the application function is known;
  based on determining that the asymptotic complexity of the application function is known, generate, based on the asymptotic complexity, execution estimates for a plurality of computational storage devices based on the application function, the data specifier, the one or more operating parameters, and computational and storage capabilities associated with the plurality of computational storage devices;
  based on determining that the asymptotic complexity of the application function is unknown:
    conduct one or more test executions of the application function on a temporary dataset;
    determine a new asymptotic complexity of the application function based on the one or more test executions; and
    generate, based on the new asymptotic complexity, the execution estimates for a plurality of computational storage devices based on the application function, the data specifier, the one or more operating parameters, and computational and storage capabilities associated with the plurality of computational storage devices; and
  select a target computational storage device from the plurality of computational storage devices based on the execution estimates.

12. The at least one computer readable storage medium of claim 11, wherein the execution estimates include a cost to read data, a cost to transfer data and a cost to execute the application function on data.

13. The at least one computer readable storage medium of claim 11, wherein the instructions, when executed, further cause the memory controller to:

determine the computational and storage capabilities at an initialization time; and update the computational and storage capabilities at a runtime.

14. The at least one computer readable storage medium of claim 11, wherein the computational and storage capabilities include one or more of power capabilities, memory capabilities, access time capabilities, fixed-function capabilities or performance capabilities.

15. The at least one computer readable storage medium of claim 11, wherein the one or more operating parameters include one or more preferences and one or more criteria.

16. A method comprising:

detecting an application function to execute on a computational storage device with a data specifier of data to operate on with the application function, the application function having one or more operating parameters to define execution of the application function;

determining whether an asymptotic complexity of the application function is known;

based on determining that the asymptotic complexity of the application function is known, generate, based on the asymptotic complexity, execution estimates for a plurality of computational storage devices based on the application function, the data specifier, the one or more operating parameters, and computational and storage capabilities associated with the plurality of computational storage devices;

based on determining that the asymptotic complexity of the application function is unknown:

conducting one or more test executions of the application function on a temporary dataset;

determining a new asymptotic complexity of the application function based on the one or more test executions; and generating, based on the asymptotic complexity, the execution estimates for a plurality of computational storage devices based on the application function, the data specifier, the one or more operating parameters, and computational and storage capabilities associated with the plurality of computational storage devices; and selecting a target computational storage device from the plurality of computational storage devices based on the execution estimates.

17. The method of claim 16, wherein the execution estimates include a cost to read data, a cost to transfer data and a cost to execute the application function on data.

* * * * *